United States Patent
Guerin et al.

(10) Patent No.: US 6,972,308 B2
(45) Date of Patent: *Dec. 6, 2005

(54) COMPOSITION, FOR USE IN COATINGS, BASED ON A MIXTURE OF EMULSION(S) AND OF DISPERSION(S) OF POLYOL POLYMER AND COATING(S) PRODUCED THEREFROM

(75) Inventors: Gilles Guerin, Eaubonne (FR); Bruno Langlois, Sainte Genevieve des Bois (FR); Roland Reeb, Gressy (FR)

(73) Assignee: Rhodia Chimie, Boulogne Billancourt (FR)

( * ) Notice: Subject to any disclaimer, the term of this patent is extended or adjusted under 35 U.S.C. 154(b) by 0 days.

This patent is subject to a terminal disclaimer.

(21) Appl. No.: 10/420,419

(22) Filed: Apr. 22, 2003

(65) Prior Publication Data

US 2003/0181577 A1  Sep. 25, 2003

Related U.S. Application Data

(63) Continuation of application No. 09/780,746, filed on Feb. 9, 2001, now abandoned, which is a continuation of application No. 08/956,566, filed on Oct. 23, 1997, now abandoned, which is a continuation of application No. 08/599,828, filed on Feb. 12, 1996, now abandoned.

(30) Foreign Application Priority Data

Feb. 21, 1995 (FR) .................................. 95 02001

(51) Int. Cl.$^7$ ................................................ C08K 3/20

(52) U.S. Cl. ...................... 524/501; 524/507; 524/591
(58) Field of Search ................................ 524/501, 507, 524/591

(56) References Cited

U.S. PATENT DOCUMENTS

| | | | |
|---|---|---|---|
| 3,660,304 A * | 5/1972 | Matsukawa .................. | 264/4.3 |
| 3,954,900 A * | 5/1976 | Schmalz et al. ............. | 525/440 |
| 4,396,738 A * | 8/1983 | Powell et al. ............... | 524/228 |
| 4,609,690 A | 9/1986 | Gruber et al. ............... | 523/334 |
| 4,849,262 A | 7/1989 | Uhl et al. .................... | 427/288 |
| 5,075,372 A * | 12/1991 | Hille et al. .................. | 524/839 |
| 5,401,553 A | 3/1995 | Miwa et al. .................. | 428/94 |
| 5,739,206 A | 4/1998 | Langlois et al. ............ | 524/591 |
| 5,852,120 A * | 12/1998 | Bederke et al. ............. | 525/124 |
| 5,994,460 A * | 11/1999 | Langlois et al. ............ | 524/839 |

FOREIGN PATENT DOCUMENTS

| | | | | |
|---|---|---|---|---|
| EP | 7032 A | * | 1/1980 | .......... C08G 18/80 |
| FR | 2703358 A1 | * | 10/1994 | .......... C08G 18/80 |

* cited by examiner

Primary Examiner—Bernard Lipman

(57) ABSTRACT

The present invention relates to a composition comprising at least one masked or unmasked polyisocyanate in the form of an aqueous emulsion whose mean size is between 0.1 and 10 micometers; and at least one polyhydroxylated polymer, advantageously a polyol, in the form of a second aqueous dispersion whose mean size is between 10 and 200 nanometers wherein the content of polyhydroxylated polymer, advantageously of polyol, expressed in mass per cent, is at least equal to 5/6R-20, with R equal to the ratio of the mean size ($d_{50}$) of the emulsion to that of the dispersion of polyhydroxylated polymer, advantageously of polyol.

18 Claims, No Drawings

COMPOSITION, FOR USE IN COATINGS, BASED ON A MIXTURE OF EMULSION(S) AND OF DISPERSION(S) OF POLYOL POLYMER AND COATING(S) PRODUCED THEREFROM

This application is a continuation application of Ser. No.: 09/780,746, filed on Feb. 09, 2001, now abandoned, which is a continuation application of Ser. No.: 08/956,566, filed on Oct. 23, 1997, now abandoned, which is a continuation application of Ser. No.: 08/599,828, filed on Feb. 12, 1996, now abandoned.

The present invention relates to mixtures of emulsions with dispersions of polymer. It relates more particularly to the stability of a particularly fine polyol dispersion, advantageously a (nano)latex, conjointly with an emulsion of isocyanate which is in most cases masked.

Such compositions are especially useful for varnishes and paint, but they can be useful for any application employing the condensation properties of isocyanates. They can also be useful in any field in which emulsions of isocyanates, in most cases blocked ones, need to coexist with dispersions of insoluble alcohols of different particle size and especially in formulations for agriculture.

In the remainder of the present description the term dispersion will be employed for polymers containing hydroxyl functional groups and especially polyols, while the expression emulsions will be employed for isocyanates, whether blocked or not.

The use of organic solvents is increasingly frequently criticized by the authorities responsible for safety at work because these solvents, or at least some of them, are reputed to be toxic or chronically toxic. This is why attempts are being made to develop more and more techniques which replace techniques in a solvent medium in order to overcome the disadvantages associated with the solvents.

One of the most frequently employed solutions lies in the use of emulsions or dispersions in water.

To produce paint or varnish films, two dispersions are mixed, an emulsion containing the isocyanate, which may be blocked, and a dispersion of polyol.

The mixture of the dispersions, which may also contain pigments and fillers, is then deposited on a substrate in the form of a film with the aid of conventional techniques for applying industrial paints. When the preparation contains blocked isocyanates the combination of film plus substrate is cured at a sufficient temperature to ensure the deblocking of the isocyanate functional groups and the condensation of the latter with the hydroxyl groups of the polyol particles.

In the present description the particle size characteristics frequently refer to notations of the $d_n$ type, where n is a number from 1 to 99; this notation is well known in many technical fields but is a little rarer in chemistry, and therefore it may be useful to give a reminder of its meaning. This notation represents the particle size such that n % (by weight, or more precisely on a mass basis, since weight is not a quantity of matter but a force) of the particles are smaller than or equal to the said size.

In the remainder of the description the polydispersity index will be employed, which is defined as follows $I=(d_{90}-d_{10})/d_{50}$ Typically the ratios of the mean sizes ($d_{50}$) between the isocyanate emulsion and the polyol dispersion are between 2 and 200. Thus, the mean sizes of the isocyanate emulsions manufactured according to the technique described in the French Patent Application filed on Mar. 3, 1993 under No. 93 03795 and published under No. 2703358 on Jul. 10, 1994 have mean sizes of between 0.1 and 10 micrometres and more generally between 0.3 and 2 micrometres. The polyol dispersions employed in combination with these emulsions have mean sizes measured by quasielastic scattering of light which are between 20 and 200 nanometres and more generally between 50 and 150 nanometres.

When dispersions of different sizes are mixed, which is generally the case, so as to obtain molar ratios between the NCO and OH groups of between 0.3 to 10 and more preferably between 0.8 and 1.5, an instability is observed in the mixtures of the two dispersions.

To give an example, this instability is reflected in a fast macroscopic separation, generally over a few minutes, to give, on the one hand, a fluid phase and, on the other hand, a very viscous phase.

This results not only in it being impossible to preserve (store) these mixtures, but also in extreme difficulty in applying this mixture to the surface which it is desired to cover according to the usual techniques for the application of paints and varnishes. If these unstable mixtures are applied onto a substrate, such as onto a sheet of glass or metal, the resulting film is not transparent but looks opaque and heterogeneous and is therefore not suitable.

These problems are particularly acute in the case of isocyanates, whether masked or not, when the latter are mixed with insoluble polyols dispersed in water and when the dispersion is very fine, that is to say when the ratio R is higher than or equal to 30 (one significant digit).

Thus, one of the objectives of the present invention is to provide a technique which makes it possible to provide fluid and stable mixtures of an isocyanate emulsion with very fine dispersions of polyols which are stable per se, especially without there being any need to add any additional or neutralizing additive, for example to adjust a pH.

Another objective of the present invention is to provide compositions comprising an emulsion of masked isocyanates and a dispersion of polyols which are physically stable for at least a month.

The other objective of the invention is to obtain, from these stable and fluid mixtures of this emulsion with a polyol dispersion, films exhibiting good gloss, transparency and solvent resistance properties.

These objectives are attained by means of a composition comprising:
- at least one masked or unmasked polyisocyanate in the form of an aqueous emulsion whose mean size is between 0.1 and 10 micrometres and preferably smaller than 2 and larger than 0.2 micrometres,
- at least one polyhydroxylated polymer, advantageously a polyol, in the form of an aqueous dispersion whose mean size is between 10 and 200 nanometres.

The ratio (R) between the mean sizes of the elementary particles ($d_{50}$) of the emulsion and that of the polyol dispersion is at least equal to 30 (one significant digit) and preferably at most equal to 200.

It is highly desirable that the emulsion and/or the dispersion should be dispersed as little as possible.

Thus, in the case of the polyhydroxylated polymers, the polydispersity index (defined as $I=(d_{90}-d_{10})/d_{50}$) is at most equal to 2 advantageously equal to 1. These values are particularly satisfactory for latices. With the other types of polymers the best results are obtained with values of 0.2 to 0.1 or even less.

Thus in the case of the polyisocyanates, masked or otherwise, the polydispersity index defined as $(d_{90}-d_{10})/d_{50}$ is at most equal to 2 advantageously equal to 1. The best results are obtained with values of 0.9 to 0.8 or even less.

The formulation regions depend on the ratio R of the mean sizes ($d_{50}$) between the isocyanate emulsion and those of the dispersion of polyhydroxylated polymer(s), advantageously of polyols.

R is equal to the mean size of the emulsion over the mean size of the dispersion of polyhydroxylated polymer, advantageously of polyol.

According to the invention, the quantity of polyhydroxylated polymer, advantageously of polyol, in is the mixture is chosen so as to meet the following constraint:

the content of polyhydroxylated polymer, advantageously of polyol, expressed in mass per cent, is at least equal to 5/6R-20, advantageously at least equal to 5/6R-18, preferably to 5/6R-16;

with R equal to the ratio of the mean size ($d_{50}$) of the emulsion to that of the dispersion of polyhydroxylated polymer, advantageously of polyol.

In other words R=($d_{50}$ of the emulsion)/($d_{50}$ of the dispersion).

The ratio of the number of hydroxyl functional groups to the number of isocyanate functional groups, masked or otherwise, can vary very widely, as shown above.

Ratios which are lower than the stoichiometry promote plasticity, while ratios which are higher than the stoichiometry produce coatings of great hardness. It is rare to have ratios which depart from the range extending from 0.5 to 2.

However, in the majority of cases and for the most common applications, to obtain varnish or paint films which are satisfactory, it is preferable that the quantity, expressed in equivalents, of reactive blocked isacyanates should be substantially equal to that of the free and reactive alcohol functional groups, expressed in equivalents, that is to say corresponding to the stoichiometry. By way of guidance, it may be indicated that a tolerance of plus or minus 20% relative to the stoichiometry exists, but it is preferably to employ only a tolerance of plus or minus 10 or 20%.

The isocyanate emulsions are advantageously made according to the technique described in the French Patent Application published under No. 2703358 on Jul. 10, 1994, filed on Mar. 31, 1993 under No. 93 03795 and entitled: "Process for the preparation of aqueous emulsions of advantageously masked (poly)isocyanate oils and/or gums and/or resins and emulsions obtained".

With regard to the additional components of a composition according to the present invention, it is possible that it additionally comprises at least one catalyst for releasing the masked isocyanates, and especially tin-based catalysts which are latent or otherwise. It may be stated that these catalysts may be present either within the polyol phase or within the asked isocyanate phase or in dispersed form within the continuous aqueous phase. Finally, they may be dissolved in the aqueous phase.

The polyol dispersions which can be used for the invention are, except as regards their fineness, conventional products employed in the paint and varnish industry. In most cases they are (co)polymers manufactured in emulsion according to the conventional processes of radical or bulk polymerization.

The nanolatices are advantageously those which can be obtained by the processes described or mentioned in the European Application filed under No. 95/401795.3 or those which are described in their use as binder in European Application No. 94/402370.4.

They are made more particularly from alkylenediol acrylate and especially from ethylene glycol methacrylate, which has one of the "ol" functional groups free.

The technique described in the European Application filed under No. 94/401795.3 may be recalled hereinafter.

This process makes it possible to prepare latices as emulsion of ultrafine size, which do not discolour, have a narrow particle size distribution and are easily reproducible, employing a minimum quantity of surfactant. This process is characterized in particular by the incremental introduction of monomers and of initiators into an aqueous reaction medium so that the ionicity of the reaction medium remains constant.

An embodiment of the process for producing a water-based dispersion containing between approximately and approximately 50% by weight of solid products comprises the following stages:

(a) incremental addition of one or more ethylenically unsaturated monomers capable of polymerizing in an aqueous environment, to a reactor containing water and up to 6.3 parts, per 100 parts of the said monomers, of one or more surfactants;

(b) incremental addition of one or more polymerization initiators to the said reactor; and (c) polymerization of the said ethylenically unsaturated monomer(s) such that the mean size of the particles of the said polymerized monomers is smaller than 100 nm.

In the preferred embodiments the process employs monomers derived from acrylic acids and esters and gives latices of ultrafine size which have a mean particle size smaller than 50 nm.

The polymer latex of ultrafine size which is obtained by this process is stable to coagulation and can therefore be diluted with water. The polymer particles have a number of physical attributes such as good film formation, good penetration into porous substrates, a very high ratio of specific surface to s volume, a monomodality and the like.

If one returns to non-nanolatex polyols, by way of example or rather as paradigm, the product sold under the trademark: Rhoplex® AC-1024 may be mentioned (compare the datasheet published in 1984).

A pigment known per se may be added in the case of paints, provided that it is inert towards the constituents of the composition.

Although it is possible according to the present invention to employ unmasked isocyanates, and as is the latter are not very stable in water, the preferred isocyanates are those which are masked, especially by masking agents which are themselves known, such as phenols, ketone oximes and especially methyl ethyl ketone oxime and various pyrazoles.

The preferred isocyanates are those in which the nitrogen of at least one of the isocyanate groups is attached to a carbon with $sp^3$ hybridization advantageously carrying one, and preferably two, hydrogen atom(s). The isocyanates in which all the functional groups have this characteristic (possibly with its preferred options) are highly valued.

It is possible in particular to mention isocyanates, masked or otherwise, which have one or more isocyanuric rings and/or at least one of the functionalities of biuret or dimer type.

It is preferable that the isocyanates should exhibit the abovementioned two characteristics, namely oligomerism and aliphatic character on at least one of the isocyanate functional groups.

The water content of the said compositions is advantageously at least equal to one third of the mass of the composition, advantageously at least 2/5.

The preferred polyols are in the form of an aqueous dispersion of nanolatex; they have a mean size smaller than 50 nanometres. Preference is given to aqueous dispersions with a low content of water-soluble compounds such as alcohols and amines, which can result in the coagulation of the isocyanate emulsion. It is therefore highly desirable that the cumulative content of various alcohols and amines should be lower than that which would produce a coagulation of the isocyanate emulsion.

The present invention is also aimed at the coatings obtained from the compositions in accordance with the present invention. These coatings may be obtained by crosslinking, in particular by curing at a temperature close to that corresponding to the release of the masked isocyanates, optionally in the presence of one or more catalysts.

The following nonlimiting examples illustrate the invention.

EXAMPLE 1

Tolonate D2® is a mixture of oligomers containing an isocyanuric ring essentially of the trimer masked with methyl ethyl ketone oxime.

Tolonate D2® is a mixture of oligomers containing an isocyanuric ring essentially of the trimer masked with dimethylpyrazole.

Nanolatex 42 is a nanolatex dispersion prepared according to the technique described below. It has a mean diameter of 32.5 nm (hydrodynamic diameter of between 30 and 35 nm), measured by quasielastic light scattering. It consists of 30% of methyl methacrylate unit, of 50% of butyl acrylate unit and of 20% of ethylene glycol methacrylate (2-hydroxyethyl methacrylate) unit. Its solids content is 29%, its pH is 2.5 and its Tg (glass transition temperature) is equal to 15° C.

The isocyanate is emulsified in the form of an emulsion in which the $d_{50}$ is 1.1 micrometres. The ratio of the sizes (R) is equal to 35.

The mixture containing 20% by weight of Nanolatex 42 and 10% by weight of Tolonate® is fluid and stable.

The corresponding 9%/9% Nanolatex 42/Tolonate® mixture gives rise to a macroscopic phase separation between a fluid phase and a flocculated mixture.

EXAMPLE 2

Nanolate R27 is a nanolatex dispersion prepared according to the technique described below. It has a mean diameter of 27.5 nm (hydrodynamic diameter of between 20 and 35 nm), measured by quasielastic light scattering. It consists of 40% of methyl methacrylate unit, of 50% of butyl acrylate unit and of 10% of ethylene glycol methacrylate (2-hydroxyethylmethacrylate) unit. Its solids content is 30%, its pH is 2.5 and its Tg (glass transition temperature) is equal to 20° C.

The isocyanate is emulsified in the form of an emulsion in which the $d_{50}$ is 1.1 micrometres. The ratio of the sizes (R) is equal to 42. The mixture containing 20% by weight of Nanolatex R27 and 10% by weight of Tolonate® is fluid and stable.

The corresponding 12%/12% Nanolatex 42/Tolonate® mixture gives rise to a macroscopic phase separation between a fluid phase and a flocculated mixture.

EXAMPLE 3

Synthesis of the Nanolatices of Examples 1 and 2

A charge solution is prepared by mixing acrylic monomers in the proportions shown in each of the examples.

In a separate feed receptacle, 0.25 pph of ammonium peroxydisulphate are added to 65 pph of water. In a separate reactor, 3 pph of sodium dodecyl sulphate are added to 195 pph of water and heated to 85° C. with continuous stirring. The reason for the separate preparation of the aqueous initiator solution is to allow a constant ionicity in the reactor throughout the length of the operating method of synthesis. Ten per cent of the total volume of the ammonium peroxydisulphate solution are added to the heated mixture, and the solutions of initiator and of monomer begin to be introduced at a rate which permits a steady introduction of the charge solutions over a period of three hours. The reaction mixture is stirred for a further 30 minutes and then cooled to 62° C. 0.10 pph of sodium metabisulphite are dissolved in 24 pph of water and introduced into the reaction mixture over a period of 1 hour. The reaction temperature is then raised to 85° C. over 1 hour. The mixture is then cooled to ambient temperature and filtered. This charge results in an aqueous polymer latex.

What is claimed is:

1. A fluid composition physically stable one month or more upon storage, consisting essentially of:
   a masked polyisocyanate in the form of an aqueous emulsion whose particle size is between about 0.1 and about 10 micrometers; and
   a polyhydroxylated polymer, in the form of an aqueous dispersion having a mean particle size ($d_{50}$), and whose particle size is between about 10 and about 50 nanometers, wherein the quantity of polyhydroxylated polymer in the composition, expressed in mass per cent, is equal to or more than 5/6R-20, R being equal to the ratio of the mean size ($d_{50}$) of the emulsion of polyisocyanate to that of the dispersion of polyhydroxylated polymer.

2. The composition according to claim 1, wherein the quantity of polyhydroxylated polymer is equal to or more than 5/6R-18.

3. The composition according to claim 1, wherein the quantity of polyhydroxylated polymer is equal to or more than 5/6R-16.

4. The composition according to claim 1, wherein said polyisocyanate has a polydispersity index defined as $(d_{90}-d_{10})/d_{50}$ being equal to or less than about 2.

5. The composition according to claim 4, wherein the polydispersity index is equal to or less than about 1.

6. The composition according to claim 1, wherein said polyhydroxylated polymer has a polydispersity index (defined as $I=(d_{90}-d_{10})/d_{50}$) being equal to or less than about 2.

7. The composition according to claim 6, wherein the polydispersity index is equal to or more than about 1.

8. The composition according to claim 1, further comprising a catalyst for releasing the masked isocyanates.

9. The composition according to claim 7, wherein the catalyst is a latent tin-based catalyst.

10. The composition according to claim 1, wherein the water content of said composition is equal to or more than about one third of the mass of the composition.

11. The composition according to claim 10, wherein the water content is equal to or more than about 2/5.

12. The composition according to claim 1, wherein said polyisocyanate has one or more isocyanuric rings.

13. The composition according to claim 1, wherein said polyisocyanate has one or more biuret functionality.

14. The composition according to claims 1, wherein said polyisocyanate has a nitrogen atom of one of the isocyanate functional groups attached io a carbon with sp$^3$ hybridization carrying one or two hydrogen atom(s).

15. The composition according to claim 1, wherein said polyisocyanate is masked by a masking agent selected from the group consisting of phenols, ketone oximes and pyrazoles.

16. The composition according to claim 15, wherein the masking agent is methyl ethyl ketone oxime.

17. The composition according to claim 1, wherein the polyhydroxylated polymer aqueous dispersion is a nanolatex.

18. A painting composition comprising a composition as defined in claim 1.

* * * * *